United States Patent Office 3,345,374
Patented Oct. 3, 1967

3,345,374
CERTAIN OXATHIAZOLE AND DITHIAZOLE
DERIVATIVES
Karlfried Dickoré and Richard Wegler, Leverkusen, and
Klaus Sasse, Cologne-Stammheim, Germany, assignors
to Farbenfabriken Bayer Aktiengesellschaft, Leverkusen, Germany, a German corporation
No Drawing. Filed July 26, 1963, Ser. No. 297,972
Claims priority, application Germany, Sept. 4, 1962,
F 37,741
24 Claims. (Cl. 260—294.8)

This invention relates to new 5-membered heterocyclic compounds of the general formula

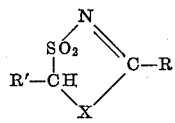

wherein X stands for oxygen and sulphur and R' for hydrogen and a lower alkyl group. R may represent an alkylated or acylated sulfhydryl such as a thioalkyl radical having 1 to 20 carbon atoms, a thioalkylphenyl radical, a thioalkyl chlorophenyl radical, a thiocarbamic acid ester radical, a dithiocarbonic acid thioester radical, a thioether radical and a sulfhydryl salt radical, a hydroxyl radical, an amino radical such as a lower alkylamino radical, a N,N-dialkylamino alkylene radical, a phenylamino radical, a nitrophenylamino radical, a chlorophenylamino radical, an alkylphenylamino radical, a benzoylamino radical, a N-substituted amino acid ester radical, an acid amide radical of a lower aliphatic carbonic radical and an amino group, a radical of a substituted or unsubstituted aliphatic or aromatic hydrocarbon such as an alkyl radical having not more than 6 carbon atoms, a heterocyclic radical such as a pyridyl radical and a furyl radical, a phenyl radical, a chlorophenyl radical, a nitrophenyl radical, a lower alkyl substituted phenyl radical, a lower alkoxy substituted phenyl radical; R may further stand for a bivalent radical which is linked to two of the 5-membered heterocyclic radicals of the invention such as a phenylene radical and a lower alkylene radical.

The compounds prepared according to the invention are substituted 1,3,4-dithiazoline-3-dioxides and 1,3,4-oxathiazoline-3-dioxides.

A further object of this invention is a process for preparing these heterocyclic compounds by cyclization of an acylated α-halogenalkane sulfonamides in the presence of a fluid medium, a basic compound as a catalyst at a temperature from 0 to 150° C. The reaction is illustrated by the following equations:

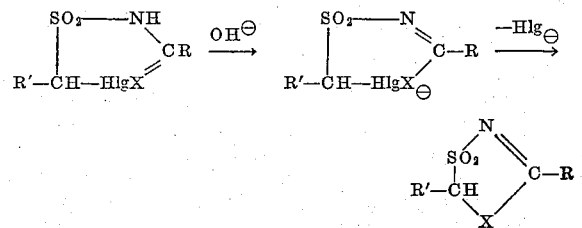

wherein R, R' and X are as above defined and Hlg represents halogen.

The course of this reaction is definitely unexpected since halogen atoms which are in the α-position to a sulphonyl group are generally practically inert to nucleophilic reagents (Methods of Organic Chemistry by Houben-Weyl, 4th edition, vol. V/4 (1960), page 695). Thus one has never hitherto succeeded in substituting the halogen in α-halogenated alkane sulphonamides by other radicals although many experiments have been carried out for this purpose (T. B. Johnson and I. B. Douglas, J. Amer. Chem. Soc. 63, 1571 (1941); H. J. Barber, H. J. Cottrell, R. F. Fuller and M. B. Green, J. App. Chem. 3, 254 (1953)). On the other hand, the hydrolysis of halogen methane sulphonamides by aqueous alkalis is known, but this leads to complete decomposition of the sulphonamide molecule, all the sulphur then appearing as inorganic sulphite (W. F. Farrar, J. Chem. Soc. (London) 1960, 3058). It is then all the more surprising that the reactions according to the invention can be carried out in the presence of aqueous sodium hydroxide.

Starting materials for the reactions according to the invention are all primary α-halogenated sulphonamides, such as chloromethane sulphonamide, α-chloroethane sulphonamide, α-chloropropanesulphonamide, α-chlorobenzylsulphonamide, α-bromomethanesulphonamide, α-bromoethanesulphonamide and the like. In the acylating stage which then takes place, the α-halogenalkanesulphonamide is reacted with any of the usual acylating agents used in organic chemistry. These are understood here to be derivatives of carboxylic acids, thiocarboxylic acids, carbonic acids and thiocarbonic acids capable of reacting with the primary sulfonamide group. Thus acylating agents suitable for the process according to the invention are aliphatic, aromatic and heterocyclic carboxylic acid chlorides, anhydrides, isocyanates, pyrocarbonic acid ester, diketene, thiocarboxylic acid chlorides, isothiocyanates, chloroformic acid esters, thiocarbonic acid ester chlorides, carbon disulphide or carbon oxysulphide. Bifunctional acylating agents may also be used, for example terephthalyl chloride, isoterephthalyl chloride, adipic acid chloride, hexamethylene diisocyanate or naphthylene-diisocyanate-(1:5).

Suitable solvents for the cyclization stage are water, ethanol, ether, acetonitrile, dimethylformamide, dimethylsulphoxide, benzene, chlorobenzene, toluene, xylene, pyridine etc.

Suitable bases are for example, hydroxides, carbonates or bicarbonates of alkali or alkaline earth metals. Tertiary amines are also suitable, for example triethylamine, hexahydrodimethylaniline, pyridine or quinoline. These may be used in excess so that they act at the same time as solvents and diluents.

The temperatures required for the reactions according to the invention lie in the range of 0 to 150° C., preferably between 20 and 100°.

The process according to the invention may be carried out by mixing the isolated N-acyl-α-halogenalkanesulphonamide in suitable solvents or diluents with a calculated equivalent quantity or an excess of a suitable base and stirring until the reaction is complete.

According to a particular method of carrying out the process, it is advantageous to dispense with the isolation of the acylated intermediate stage, and to react 1 mol of a primary α-halogenalkane-sulphonamide directly with 1 mol of an acylating agent and with 1 to 2 mols of a base, depending on the type of acylating agent. If a weak base is used, for example pyridine, larger excesses may advantageously be used. If the new heterocyclic compounds carry free mercaptohydroxyl or primary or secondary amino groups in the 5-position, further reactions may easily be carried out with alkylating or acylating agents, so that a large number of new compounds can be built up. Another possibility of synthesizing 1:3:4-dithiazoline-3-dioxide substituted in the 5-position by amine groups consists in reacting the 5-alkylmercapto compounds with primary or secondary amines. The compounds prepared by the process are, e.g. valuable intermediate products for the production of anthraquinone dyestuffs.

The following two formulae give examples for anthraquinone dyestuffs which are derived from a compound of this invention

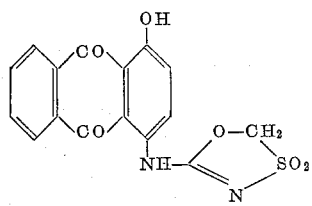

and

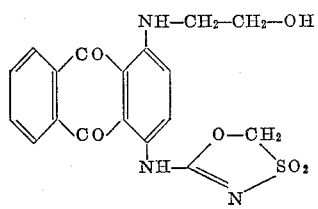

Moreover, these compounds may be used in the pharmaceutical field, where they show an analgesic effect.

The following examples will serve to explain the process.

In the examples, the temperatures are given in degrees of centigrade.

*Example 1*

A filtered solution of 11.7 g N-benzoyl-chloromethane-sulphonamide (prepared according to A. G. Kostsova, J. Gen. Chem. (U.S.S.R.) 11, 63 (1941) [C.A. 35, 5462³ (1941)] in a mixture of 100 ml. of water and 5 ml. of 10 N-sodium hydroxide are heated 2 hours on a boiling water bath. The reaction product begins to crystallize in long needles as a completely pure product as soon as a temperature of 80° is reached. A yield of 8.5 g. of a compound of the formula

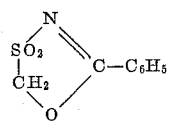

is obtained. Melting point 162–163°.

The compound may also be prepared as follows: 14 g. of benzoyl chloride are added dropwise with stirring to a solution of 12.9 g. of chloromethane sulphonamide in 70 ml. of pyridine, the temperature rising to 80°. The mixture is then stirred for another 30 minutes at 80° and the reaction product is then precipitated with water. 15 g. of a crude product of melting point 158–161° is obtained. This yields 13.5 g. of a product of melting point 162–163° after recryastallization from 400 ml. of methanol.

*Example 2*

37.3 g. of N-chloromethanesulphonyl-N'-phenylurea in 250 ml. of dimethylformamide are treated, with stirring, with 15 ml. of 10 N-sodium hydroxide. The temperature of the mixture rises to 40°. Approximately 50 ml. of solvent are distilled off in vacuo, the residue is stirred for another 2 hours at 100°, and then concentrated in vacuo to about half the volume. The reaction product, which has the formula

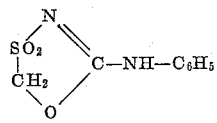

is precipitated by pouring into 500 ml. of water. After drying at 100°, 28 g. of a product decomposing at 148 to 152° are obtained. The product decomposes at 152–153° after recrystallization from methanol.

The starting material is prepared as follows: 30 ml. of 10 N-sodium hydroxide and 35.7 g. of phenylisocyanate are simultaneously added dropwise at 0 to 5° to a solution of 39 g. of chloromethane sulphonamide in a mixture of 200 ml. of water and 50 ml. of acetone. The mixture is then stirred for another 45 minutes at 5–10°, and some diphenyl urea (approximately 3 g.) is filtered off. The filtrate is acidified with 21 ml. of concentrated hydrochloric acid, the precipitated product is isolated by suction filtration and washed with water until neutral. After drying, 70 g. of N-chloromethanesulphonyl-N-phenylurea are obtained which melts at 135 to 147° after recrystallization from a large volume of benzene.

*Example 3*

55.7 g. of 4-nitrobenzoyl chloride are gradually added in separate portions into a stirred solution of 39 g. of chloromethane sulphonamide in 200 ml. of pyridine. The mixture is stirred for another 30 minutes at 80° and then poured into 1 litre of water. The product, separated by suction filtration, is washed with water and a small quantity of methanol. 62 g. of a compound of formula

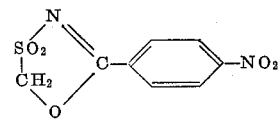

are obtained. Melting point 227 to 230° C.

*Example 4*

39 g. of chloromethane sulphonamide are treated with 47 g. of o-toluylchloride in the same way as described in Example 3, and 33 g. of a compound of the formula

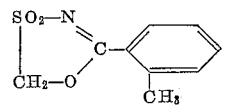

are obtained. Melting point (from methanol): 130 to 132°.

*Example 5*

35 g. of o-chlorobenzoyl chloride are added dropwise, with stirring, to a solution of 26 g. of chloromethane sulphonamide in 150 ml. of pyridine, and the mixture is stirred for another 30 minutes at 80°. After pouring the mixture into water, the precipitated reaction product is removed by suction filtration and crystallized from ethanol.

27 g. of a compound of the formula of melting point 132–134° are obtained.

*Example 6*

145 ml. of thionyl chloride are poured onto 49.4 g. of isonicotinic acid in a large flask and the mixture is slowly heated and then boiled until evolution of gas ceases (about 30 minutes). The excess of thionyl chloride is removed, finally in vacuo. The crystaline residue 71 g. of crude isonicotinic acid chloride-hydrochloride, is introduced in portions into a stirred solution of 52 g. of chloromethane sulphonamide in 250 ml. of pyridine. When the strongly exothermic reaction has ceased, the mixture is stirred for 30 minutes at 80° and then poured into 600 ml. of a mixture of ice and water. The precipitated reaction product is separated by suction filtration, washed with water and dried at 20°.

40 g. of a compound of the formula

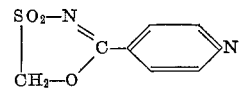

found to be completely pure an analysis are obtained directly. The product decomposes at 335–350° after brown discoloration from 305° upwards.

Example 7

40 g. of thoroughly triturated terephthalic acid dichloride are gradually stirred into a solution of 52 g. of chloromethanesulphonamide in 300 ml. of pyridine and the mixture is then stirred for another hour at 80°. It is then poured into about 1.5 litre of water, isolated by suction filtration and washed, first with water and then with methanol. 41 g. of a compound of the formula

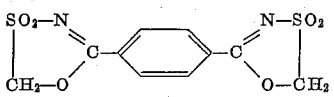

of melting point 300 to 302° (decomposition) (from dimethylformamide) are obtained.

Example 8

300 ml. of 10 N-sodium hydroxide are added dropwise at 20° to a solution of 390 g. of chloromethane sulphonamide in 2 litres of dimethylformamide, and a solution of 219 g. of methylisothiocyanate in a small quantity of dimethylformamide is then added dropwise, with stirring, at 20 to 30°. After stirring for 5 hours at 60°, approximately 1.5 litres of solvent are distilled off in vacuo and the residue is stirred into 5 litres of water. The reaction product gradually crystallizes. It is isolated by suction filtration at 20° and washed with water, and after drying in vacuo at 100°, 269 g. of a compound of the formula

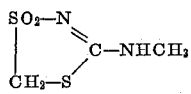

are obtained. Another 77 g. are obtained by oversaturating the filtrate with sodium chloride. Melting point: 152–156° (from methanol).

Example 9

10 g. of triethylamine and 13.5 g. of phenylisothiocyanate are added to a solution of 13 g. of chloromethanesulphonamide in 80 ml. of acetonitrile. After stirring for another 5 hours at 50° C. the mixture is stirred into 1 litre of water and the reaction product thereby precipitated is isolated by suction filtration. After drying in vacuo at 150°, 15.5 g. of a compound of the formula

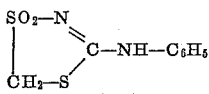

of melting point (from methanol) 176° (labile form) are obtained; 188 to 190° (stable form).

Example 10

24.5 g. β-phenethylisothiocyanate are added to a solution of 19.4 g. of chloromethane sulphonamide in 150 ml. of dimethylformamide. The mixture is stirred for another 2 hours at 100°, 100 ml. of the solvent is distilled off in vacuo and the dark colored residue is poured into water. The reaction product, which is at first precipitated in an oily form, is taken up in benzene and the solution is dried with sodium sulphate. The residue remaining after evaporating off the benzene gradually crystallizes. After recrystallizing the crude product from a small quantity of benzene, 18 g. of a compound of the formula

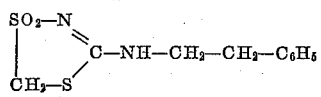

of melting point 83–88° are obtained.

Example 11

51.5 g. of 3-diethylamino-propyl-isothiocyanate-(1) are added dropwise to a solution of 39 g. of chlormethane sulphonamide in 150 ml. of dimethylformamide, the mixture is stirred for another 4 hours at 60° and condensed to completion in a water bath in vacuo. The residue is dissolved in 300 ml. of methanol, clarified with animal charcoal and again condensed by evaporation and treated with 30 ml. of 10 N-sodium hydroxide in 200 ml. water. The reaction product crystallizes when left to stand for some time in a refrigerator. It is washed with water and dried at 60° and, after recrystallizing from methanol, 37 g. of a compound of the formula

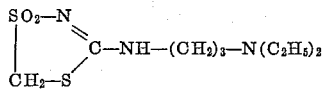

is obtained. It contains 1 mol of water of crystallization and melts at 56–58°. The hydrochloride melts at 146–152°.

Example 12

3-dimethylaminopropylisothiocyanate-(1) (43 g.) is treated in the same way as described in Example 11 and under the same conditions with 39 g. of chloromethanesulphonamide, and after working the product up in the same way, 41 g. of a compound of the formula

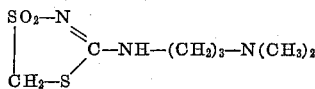

are obtained. The substance melts at 134–137°.

Example 13

30 ml. of 10 N-potassium hydroxide followed by 36 ml. of carbon disulphide followed by another 30 ml. of 10 N-potassium hydroxide are added dropwise with stirring to a solution of 39 g. of chloromethanesulphonamide in 300 ml. of dimethylformamide. The temperature is maintained at 25–30° by slightly cooling the mixture. The mixture is then stirred for another 4 hours at room temperature. Approximately one-third of the liquid volume is then distilled off, first in a vacuum produced by a water jet pump and then with the aid of an oil pump. The internal temperature should not rise above 60° in this process. Precipitated potassium chloride (20 g.) is then removed by suction filtration and the filtrate is concentrated at 60° in an oil pump vacuum until it has a pasty consistency. The residue is stirred with acetone and the precipitated crystalline powder is removed by suction filtration, 33 g. of a compound of the formula

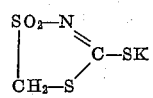

being obtained. Another 9 g. of this potassium salt are obtained by concentrating the filtrate and recrystallizing the residue from a small quantity of water.

Example 14

40 g. of furan-2-carboxylic acid chloride are added dropwise to a solution of 39 g. of chloromethanesulphonamide in 150 ml. of pyridine with stirring at such a rate that the temperature rises to about 80°. The mixture is then stirred for another 30 minutes at 80° and poured into one litre of water. The precipitated reaction product is washed with water and dried at 100° in vacuo. 33 g. of a compound of the formula

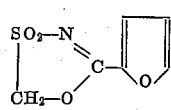

which melts at 195 to 198° after recrystallization from acetone are obtained.

Example 15

39 g. of chloromethane sulphonamide are treated in the same way as in Example 14 with 47 g. of p-toluyl chloride, and 49 g. of a compound of the formula

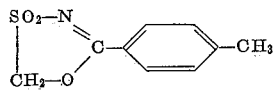

are obtained. Melting point 191 to 193° (from acetone/petroleum ether).

*Example 16*

39 g. of chloromethanesulphonamide are treated in the same way as in Example 14 with 51 g. of 4-methoxybenzoyl chloride, and after working up the reaction product, 60.5 g. of a compound of the formula

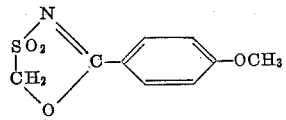

are obtained. M.P. 168 to 169° (from acetone/petroleum ether).

*Example 17*

39 g. of chloromethanesulphonamide are treated as in Example 14 with 63 g. of 2:5-dichlorobenzoyl chloride, and after working up the reaction product, 39 g. of a compound of the formula

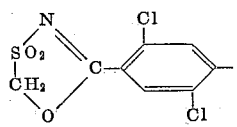

are obtained. M.P. 148–151° (from ethanol).

*Example 18*

39 g. of chloromethanesulphonamide are treated as in Example 14 with 56 g. of 3-nitrobenzoyl chloride, and after working up the reaction product, 51 g. of a compound of the formula

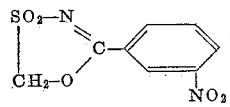

are obtained. M.P. 174–177° (from ethyl glycol).

*Example 19*

A solution of 20 g. of isophthalyl chloride in slightly dry dimethylformamide is added dropwise to a solution of 26 g. of chloromethanesulphonamide in 150 ml. of pyridine, and the mixture is then stirred for another 30 minutes at 80°. The reaction product is precipitated with water and dried at 100°.

The substance is recrystallized from dimethylformamide/methanol and melts with decomposition at 259–261°. It has the formula

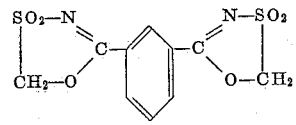

Yield: 42 g.

*Example 20*

27.5 g. of adipic acid chloride are added dropwise, with cooling, to a solution of 39 g. of chloromethanesulphonamide in 200 ml. of pyridine, and the mixture is then stirred for another 30 minutes at 80°. After pouring the reaction mixture into 1.5 litres of water, 5 g. of a compound of the formula

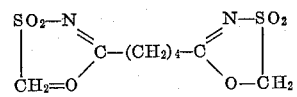

are obtained. M.P. 180–181°.

*Example 21*

50 ml. of 10 N NaOH and a solution of 82 g. of 4-nitrophenyl-isocyanate in 100 ml. of acetone are added dropwise at 0°, both at the same time and in the course of 30 minutes, to a solution of 65 g. of chloromethanesulphonamide in a mixture of 100 ml. of water and 200 ml. of acetone and during this time a total of 200 g. of small lumps of ice are added to the reaction mixture. The mixture is then stirred for another hour without external cooling, and then diluted with 500 ml. of water. Approximately 2 g. of N:N-dinitrophenylurea are filtered off and the clear filtrate is acidified with 50 ml. of conc. HCl. The precipitated reaction product is washed with water until neutral and then dried in air. 130 g. of N-(4-nitrophenyl)-N'-chloromethane-sulphonyl-urea are obtained, decomposition point 250–255°.

58.7 g. of this compound are dissolved in the cold in 100 ml. water+40 ml. 10 N NaOH, and the solution is rapidly heated to 80°. Yellow needles crystallize on cooling. These are separated by suction filtration and washed with a small amount of ice water and with acetone. 55 g. of a sodium salt of the formula

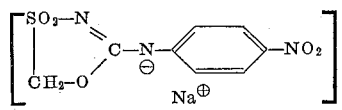

are obtained. Melting point 180–190° (decomposition).

*Example 22*

40 ml. of dimethylsulphate are added dropwise at a maximum temperature of 20°, with cooling, to a solution of 126 g. of the sodium salt described in Example 21 in 300 ml. of dimethylformamide, and the mixture is stirred for another 3 hours at room temperature. The reaction product is precipitataed with water and dried in vacuo at 100°. 99 g. of a compound of the formula

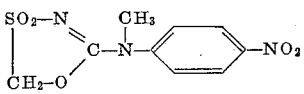

are obtained. M.P. 264–270° (decomposition) (recrystallized from acetone).

*Example 23*

A solution of 48.5 g. of potassium cyanate in 80 ml. of water is added dropwise at 50° to a solution of 65 g. of chloromethanesulphonamide in 500 ml. of dimethylformamide and the mixture is then stirred for 20 minutes at 90°. Approximately 200 ml. of solvent are then distilled off in vacuo and the precipitated potassium chloride is filtered off with suction. The filtrate is concentrated by evaporation at 80° in vacuo, and the oil which remains behind is treated with 25 ml. of water. 22 g. of a compound of the formula

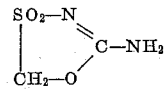

are obtained. M.P. (recrystallized from a small quantity of water) 170–173° (decomposition).

*Example 24*

29 g. of methylisocyanate and 50 ml. of 10 N NaOH are added dropwise simultaneously over one hour to a solution of 64 g. of chloromethane-sulphonamide in a mixture of 150 ml. water+75 ml. acetone and the mixture is cooled with ice at the same time and small lumps of ice are added from time to time. The clear reaction solution is acidified with 45 ml. conc. HCl and the precipitated reaction product is washed with a little water and dried in vacuo at 100°. 87 g. of N-methyl-N'-chloromethanesulphonylurea are obtained. M.P. 167–169° (from ethanol).

56 g. of this compound are dissolved in 250 ml. of dimethylformamide and treated with 30 ml. of 10 N NaOH. Approximately 50 ml. of solvent are distilled off in vacuo and the mixture is then stirred for another 2 hours at 100°. The precipitated potassium chloride is separated by filtration with suction and the filtrate is concentrated in vacuo. The residue is stirred with a small quantity of water which causes it to crystallize. 31 g. of a compound of the formula

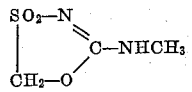

are obtained. M.P. 154–156° (from acetone).

Example 25

15 g. of the compound of melting point 154–156°, described in Example 24, are dissolved in 150 ml. of dioxane and treated with 10 ml. of 10 N NaOH, the sodium salt being thus precipitated. 9.5 ml. of dimethylsulphate are added to this suspension, most of the solvent is removed in vacuo, the mixture is filtered with suction and then washed with 20 ml. of ice water. 10 g. of a compound of the formula

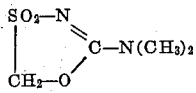

are obtained. M.P. 131–136° (from methanol).

Example 26

A mixture of 52 g. of iodomethanesulphonamide and 60 g. of benzoyl chloride is heated in an oil bath at 160° until no more HCl is evolved (about 4 hours). The reaction mixture is stirred with a small quantity of toluene in the cold and the crystals which precipitate are separated by suction filtration and recrystallised from 160 ml. xylene. 66 g. of N-benzoyl-iodomethanesulphonamide, M.P. 152–153°, are obtained.

32.5 g. of this compound are dissolved in 500 ml. of pyridine. The solution is left to stand for 2 days at room temperature and the reaction product is then precipitated with 2 litres of water and dried in vacuo at 100°. 10.5 g. of 5-phenyl-oxathiazoline-(1:3:4)-3-dioxide, melting point 162 to 163°, are obtained. This product is identical to the substance described in Example 1.

Example 27

30 ml. of 10 N NaOH, followed by 36 ml. of carbon disulphide are added with stirring to a solution of 39 g. of chloromethane sulphonamide in 200 ml. of dimethylformamide and this mixture is then stirred for another 30 minutes at 25–30°. Another 30 ml. of 10 N NaOH are then added dropwise and the mixture is stirred for another 6 hours at room temperature. At the end of this time, 29 ml. of dimethylsulphate are added dropwise and the mixture is stirred for another hour at 60° and then poured into 1 litre of water. The crystals which precipitate are removed by suction filtration, washed with water and a small quantity of methanol and dried at room temperature. 41 g. of a compound of the formula

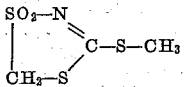

are obtained. M.P. 158–160° (from a large quantity of methanol).

Example 28

39 g. of chloromethanesulphonamide are treated with 36 ml. of carbon disulphide in the same way as described in Example 27 but the mixture is alkylated with 47 g. of diethyl sulphate, and after working up the product in an analogous manner, 45 g. of a compound of the formula

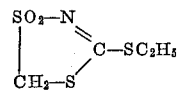

are obtained. M.P. 94–95° (from ethanol).

Example 29

39 g. of chloromethanesulphonamide are reacted with 36 ml. of carbon disulphide as described in Example 27, and then alkylated with 64 g. of butyl iodide. After working up by the same method, 42 g. of a yellow oil, B.P. 145–150° at 0.2 mm. Hg are obtained. M.P. 30–33°, $n_D^{20}$ 1.4324.

The compound has the formula

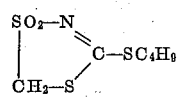

Example 30

39 g. of chloromethanesulphonamide are treated in the same way as in Example 27 with 36 ml. of carbon disulphide and the mixture is then alkylated with 95 g. of dodecyl iodide. After working up in a similar manner, 41 g. of a compound of the formula

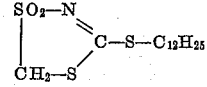

are obtained. M.P. 58–60° (from methanol).

Example 31

39 g. of chloromethanesulphonamide are treated with 36 ml. of carbon disulphide in the same way as described in Example 27, and then alkylated with 50 g. of 4-chlorobenzyl chloride. 75 g. of a compound of the formula

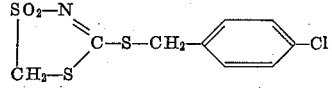

are obtained. M.P. 136–139° C. (from dioxane/petrol ether).

Example 32

A mixture of 31 g. of the potassium salt described in Example 13, 12 ml. of chloroethylacetate and 125 ml. of ethanol is boiled under reflux for 6 hours and the reaction product is poured into 1 litre of water and the crystals which precipitate are filtered off with suction. 24 g. of a compound of the formula

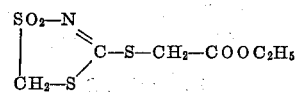

are obtained. M.P. 57–59°.

Example 33

20.7 g. of the potassium salt described in Example 13 and 9.5 g. of chloroacetamide are dissolved in 300 ml. of water. The crystals which precipitate are filtered off with suction after 14 days, washed with water and dried in air. 19.5 g. of a compound of the formula

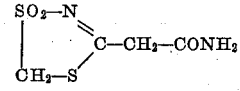

are obtained. M.P. 166–167° (decomposition).

Example 34

11.5 g. of chloroformic acid methyl ester are added to a suspension of 20.7 g. of the sodium salt of Example 13 in 70 ml. of dioxane and the mixture is then stirred for an hour at 60°. The reaction mixture is then stirred into 300 ml. of water and the precipitated product is filtered off with suction, washed with water and dried in vacuo at 60°. 20 g. of a compound of the formula

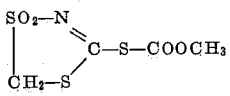

are obtained. M.P. 105–110° (decomposition with evolution of $CO_2$).

*Example 35*

26 g. of chloroformic acid ethyl ester are added to a suspension of 41.4 g. of the potassium salt described in Example 13 in 150 ml. of dioxane and the mixture is then stirred for 2 hours at 60° and poured into 700 ml. of water. The mixture is filtered in the cold with suction, washed with water and dried in vacuo at 60°, and 36 g. of a compound of the formula

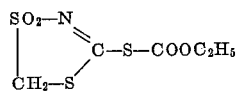

are obtained. M.P. 133° (from methanol).

*Example 36*

19 g. of chloroformic acid phenyl ester are added to a suspension of the potassium salt of Example 13 in 70 ml. of dioxane and the mixture is then stirred for one hour at 100° and then poured into 300 ml. of water. The crystals which precipitate are filtered with suction and washed with water. 25 g. of a compound of the formula

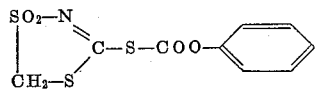

are obtained. M.P. 150–160° with decomposition (from acetone).

*Example 37*

15 g. of dithiocarbonic acid ethyl ester chloride are added to a suspension of 20.7 g. of the potassium salt of Example 13 in 75 ml. of dioxane and the mixture is then stirred for another 8 hours at room temperature. The precipitated potassium chloride is filtered off with suction and washed with a small quantity of dioxane. The reaction product is precipitated from the filtrate with about 500 ml. of petroleum ether. 21.5 g. of a compound of the formula

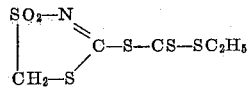

are obtained. M.P. 84–85° (from cyclohexane).

*Example 38*

42.6 g. of 2:4:6-trichlorophenyl-isothiocyanate are added to a solution of 26 g. of chloromethanesulphonamide in 250 ml. of dimethylformamide, followed by 20 ml. of 10 N NaOH. The temperature of the reaction mixture rises spontaneously to 55°. To complete the reaction, the mixture is then stirred for 4 hours at 60°. The reaction product is precipitated with about 1 litre of water to which acetic acid is added until the mixture is neutral. The precipitate is filtered off with suction, washed with water and dried in vacuo at 100°, and 42 g. of a compound of the formula

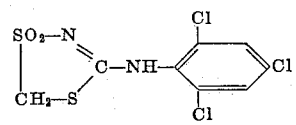

are obtained. M.P. 242–244° with decomposition (recrystallized from a large volume of methanol).

*Example 39*

49 g. of benzoyl-isothiocyanate and 30 ml. of 10 N NaOH are added dropwise both at the same time at 0 to 5°, over 2 hours, to a solution of 39 g. of chloromethane-sulphonamide in a mixture of 100 ml. of acetone and 100 ml. of water. The mixture is then stirred for one hour at 5–10°, half an hour at 20° and half an hour at 50–60° and then boiled under reflux for 1½ hours. The mixture is then diluted with 300 ml. of water and the precipitated reaction product is pressed on clay. After recrystallization from 600 ml. of acetone, 6 g. of a compound of the formula

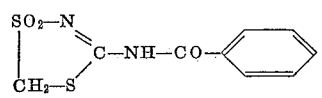

are obtained. M.P. 260–262° (with decomposition).

*Example 40*

15 ml. of 10 N NaOH are added at 70° to a solution of 25 g. of the compound described in Example 8 in 100 ml. of dioxane. The sodium salt, which precipitates immediately, is filtered off with suction at 10° and washed with acetone. 28.1 g. of the sodium salt of the compound described in Example 8 are obtained. This salt contains 1 mol of water of crystallization. It is dissolved in 100 ml. of water and 21.5 g. of dimethylsulphate are added. The reaction product is precipitated after a short time from the solution which is at first clear. The product is filtered off with suction at 0°, washed with water and dried in vacuo at 100°. 22 g. of a compound of the formula

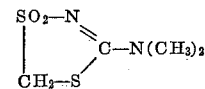

are obtained. M.P. 128–129° (from methanol).

The same compound may be prepared by the following method:

200 ml. of aqueous, approximately 10 N dimethylamine solution are poured over 35.5 g. of the methylmercapto compound described in Example 27. Vigorous evolution of methylmercaptan takes place. To complete the reaction, the reaction mixture is heated for a few minutes to 55° until the evolution of gas ceases, and the mixture is then filtered with suction at 0°, washed with a small quantity of water and dried in vacuo at 100°. 21.5 g. of 5-dimethylamino-1:3:4-dithiazoline - 3 - dioxide are obtained.

*Example 41*

10 N NaOH followed by 9.5 g. of chloroformic acid methyl ester are added to a solution of 22.8 g. of the compound of Example 9 in 200 ml. of dioxane, and the mixture is then boiled under reflux for 2 huors. The precipitated sodium chloride is filtered hot with suction. 26 g. of a compound of the formula

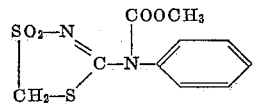

crystallization from the filtrate in the cold. M.P. 197–199° (with decomposition).

*Example 42*

30 ml. of 10 N NaOH are added dropwise to a solution of 43 g. of α-chloroethanesulphonamide in 200 ml. of dimethyl-formamide, and 36 ml. of carbon disulphide are then added and the mixture is then stirred for 15 minutes at room temperature. Another 30 ml. of 10 N NaOH are then added dropwise. The mixture is then stirred for 30 minutes at room temperature and for one hour at 60° and the excess of $CS_2$ is then removed in vacuo. After the addition of 28.5 ml. of dimethylsulphate, the mixture is stirred for half an hour at 60° and then poured into one litre of water. The precipitated crystals are then filtered off with suction, washed with a large quantity of water and a small quantity of methanol, and dried in air. 39 g. of a compound of the formula

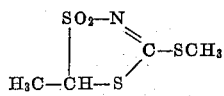

are obtained. M.P. (from methanol) 83–85°.

*Example 43*

A solution of 14.4 g. of α-chloroethanesulphonamide in 70 ml. of pyridine is treated with 11.7 ml. of benzoyl chloride with stirring and heated for half an hour at 80°. The reaction mixture is poured into 300 ml. water, filtered with suction and then washed with water and a small quantity of methanol. 17 g. of a compound of the formula

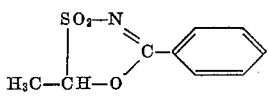

are obtained. M.P. 126°.

What is claimed is:
1. A compound of the formula

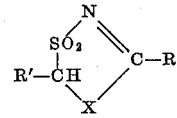

wherein X is a member selected from the group consisting of oxygen and sulfur, R' is a member selected from the group consisting of hydrogen and lower alkyl and R is a member selected from the group consisting of alkyl having up to 6 carbon atoms, phenyl, chlorophenyl, nitrophenyl, lower alkyl substituted phenyl, lower alkoxy substituted phenyl, pyridyl, furyl, amino (—NH₂), lower alkyl amino, di-lower alkyl amino lower alkylene, phenyl amino, nitro phenyl amino, chlorophenylamino, lower alkyl phenylamino, benzoyl amino, N-phenyl-N-carbomethoxy-amino, carbamylmethyl, alkylthio having 1 to 20 carbon atoms, phenyl-alkylthio, chlorophenyl-alkylthio, thiocarbamic acid lower alkyl esters, thiocarbamic acid phenyl esters, dithio carbamic acid lower alkyl esters, and sulfhydryl alkali metal salts.

2. Process for the production of a compound of the formula

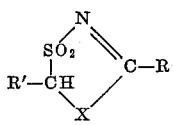

wherein X is a member selected from the group consisting of oxygen and sulfur, R' is a member selected from the group consisting of hydrogen and lower alkyl and R is a member selected from the group consisting of alkylthio having 1 to 20 carbon atoms, hydroxy, amino, alkyl having up to 6 carbon atoms, phenyl, toluyl, benzoylamino, chlorophenyl, nitrophenyl, lower alkyl substituted phenyl, lower alkoxy substituted phenyl, and a bivalent radical selected from the group consisting of lower alkylene and phenyl, which is linked to two of the 5-membered heterocyclic radicals having the formula above set out, which comprises reacting an α-halogenalkane sulfonamide with an acylating agent selected from the group consisting of benzoyl chloride, 4-nitrobenzoylchloride, o-toluylchloride, o-chlorobenzoyl chloride, isonicotinic acid chloride, terephthalic acid dichloride, phenylisothiocyanate, p-phenylethyl-isothiocyanate, 3-diethylaminopropyl-isothiocyanate, 3-dimethylamino-propyl-isothiocyanate, carbon disulfide, furan-2-carboxylic acid chloride, p-toluyl chloride, 4-methoxy-benzoyl chloride, 2:5-dichlorobenzoyl chloride, 3-nitrobenzoyl chloride, isophthalylchloride, adipic acid chloride, 4-nitrophenyliso-cyanate, KCN, methylisocyanate, benzoyl-isothiocyanate, 2:4:6-trichlorophenyl isocyanate, phenyliso-cyanate, and methyliso-thiocyanate, and cyclizing the N-acyl-α-halogenalkane sulfonamide of the formula

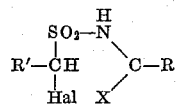

wherein R, R' and X are as above defined and Hal is a member of the group consisting of chlorine, bromine, and iodine at a temperature of from 0–150° C. in an inert fluid medium in the presence of a basic compound.

3. The compound of the formula

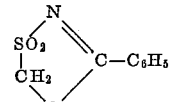

4. The compound of the formula

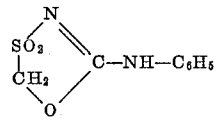

5. The compound of the formula

6. The compound of the formula

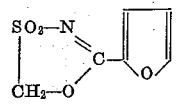

7. The compound of the formula

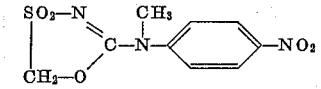

8. The compound of the formula

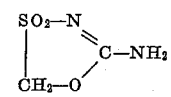

9. The compound of the formula

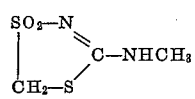

10. The compound of the formula

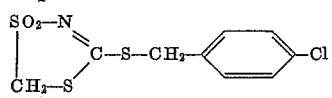

11. The compound of the formula

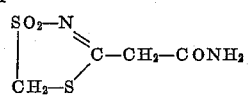

12. The compound of the formula

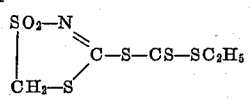

13. Process according to claim 2, wherein the product obtained is further acylated.

14. Process according to claim 2, wherein the product obtained is further alkylated.

15. Process according to claim 2, wherein the α-halogenalkane sulphonamide is chloromethane sulphonamide.

16. Process according to claim 2, wherein the acylating agent is benzoyl chloride.

17. Process according to claim 2, wherein the acylating agent is phenyl isocyanate.

18. Process according to claim 2, wherein the acylating agent is isonicotinic acid chloride hydrochloride.

19. Process according to claim 2, wherein the acylating agent is phenyl isothiocyanate.

20. Process according to claim 2, wherein the acylating agent is 3-diethylamino-propyl isothiocyanate.

21. Process according to claim 2, wherein the fluid medium is a member of the group consisting of water, ethanol and ether.

22. Process according to claim 2, wherein the basic compound is a member of the group consisting of an alkali hydroxide, an alkali carbonate, an alkali bicarbonate, an alkaline earth hydroxide, an alkaline earth carbonate, an alkaline earth bicarbonate, and a tertiary amine.

23. A compound according to claim 1 wherein X is O.

24. A compound according to claim 1 wherein X is S.

No references cited.

ALTON D. ROLLINS, *Primary Examiner.*

HENRY R. JILES, ALEX MAZEL, NICHOLAS RIZZO,
*Examiners.*

UNITED STATES PATENT OFFICE
CERTIFICATE OF CORRECTION

Patent No. 3,345,374                                  October 3, 1967

Karlfried Dickoré et al.

It is hereby certified that error appears in the above numbered patent requiring correction and that the said Letters Patent should read as corrected below.

Column 3, line 51, for "recyrastallization" read -- recrystallization --; column 4, line 73, for "an analysis" read -- on analysis --; column 4, line 75, for "305°" read -- 305° C. --; column 8, line 36, for "precipitataed" read -- precipitated --; column 12, line 62, for "crystallization" read -- crystallize --.

Signed and sealed this 19th day of November 1968.

(SEAL)
Attest:

Edward M. Fletcher, Jr.                             EDWARD J. BRENNER
Attesting Officer                                         Commissioner of Patents